United States Patent [19]

Yoshida et al.

[11] 4,222,304
[45] Sep. 16, 1980

[54] BLIND RIVET

[75] Inventors: Kosaku Yoshida, Tokyo; Kunio Hara, Kawasaki, both of Japan

[73] Assignee: Nifco Inc., Yokohama, Japan

[21] Appl. No.: 828,223

[22] Filed: Aug. 26, 1977

Related U.S. Application Data

[63] Continuation of Ser. No. 660,379, Feb. 23, 1976, abandoned.

[30] Foreign Application Priority Data

| Feb. 25, 1975 | [JP] | Japan | 50-25026 |
| May 14, 1975 | [JP] | Japan | 50-62802 |
| Jun. 26, 1975 | [JP] | Japan | 50-88712 |

[51] Int. Cl.² ............................................. F16B 13/04
[52] U.S. Cl. ................................................. 85/71; 85/77
[58] Field of Search .................. 85/7, 70, 71, 72, 73, 85/74, 75, 76, 77, 78; 206/343

[56] References Cited

U.S. PATENT DOCUMENTS

| 2,030,169 | 2/1936 | Huck | 85/70 |
| 2,408,559 | 10/1946 | Keating | 85/77 |
| 2,803,984 | 8/1957 | Swenson | 85/70 X |
| 3,178,989 | 4/1965 | Siebol | 85/71 |
| 3,230,818 | 1/1966 | Siebol | 85/71 |
| 3,251,260 | 5/1966 | Serdechny | 85/7 |
| 3,294,303 | 12/1966 | Anstett | 85/17 X |
| 3,521,521 | 7/1970 | King et al. | 85/78 X |
| 3,702,088 | 11/1972 | Schmitt | 85/77 |
| 3,785,241 | 1/1974 | Fischer | 85/71 |

FOREIGN PATENT DOCUMENTS

| 725903 | 1/1966 | Canada | 85/77 |
| 1230265 | 12/1966 | Fed. Rep. of Germany | 85/77 |
| 2301994 | 7/1973 | Fed. Rep. of Germany | 85/77 |
| 445204 | 2/1968 | Switzerland | 85/71 |
| 1228781 | 4/1971 | United Kingdom | 85/78 |
| 1325302 | 1/1973 | United Kingdom | 85/7 |

Primary Examiner—Thomas J. Holko
Attorney, Agent, or Firm—Kurt Kelman

[57] ABSTRACT

A blind rivet is injection molden from plastic material. It comprises a female member molded about a male member. The female member is comprised of a flexible tubular wall and a flange about the upper end thereof, the wall defining a stepped portion in the axial bore thereof at the upper end and a plurality of elongate perforations about the wall. The male member is comprised of a shank in the axial bore and axially movable in relation to the tubular wall, an enlarged head at one end in intimate contact and engagement with the lower end of the female member, and a head portion at the other end and protruding from the upper end of the female member. The head portion is shaped to be gripped by a tool for pulling the shank axially through the bore and the shank has a series of peripheral claws each forming a shoulder facing the lower end so that, upon pulling, the perforated flexible tubular wall collapses and expands radially and successive claws snap their respective shoulders into engagement with the shoulder of the stepped portion, the engagement of the shoulders maintaining the tubular wall of the female member radially expanded and locking the male member against axial movement towards the lower end of the female member.

5 Claims, 14 Drawing Figures

Fig_4(A) Fig_4(B)

Fig_5

BLIND RIVET

CROSS-REFERENCE TO RELATED APPLICATION

This is a continuation of our U.S. application Ser. No. 660,379, filed Feb. 23, 1976, now abandoned.

BACKGROUND OF THE INVENTION

This invention relates to a blind rivet made of a plastic material and used as a pin for uniting a plurality of superposed sheets or for fastening a part to a base plate or for serving as a leg by which a part is fastened to a base plate, and to a method for the manufacture of the rivet.

Usually, a blind rivet comprises a sleeve (female member) having a flange formed at one end thereof and a pin (male member) having at the leading end thereof a head of a diameter greater than the inside diameter of the sleeve. As disclosed by U.S. Pat. Nos. 3,178,989 and 3,230,818, for example, the male and female members of the blind rivet are separately fabricated from a malleable metal, such as aluminum alloy, copper alloy or mild steel, and they are assembled by having the pin inserted into the sleeve. U.S. Pat. No. 3,521,521 suggests the use of plastics for making blind fasteners. In actual use of this blind rivet, the pin is secured by the chuck of a tool and inserted through a perforation bored in a base plate subjected to riveting and then the pin is retrogressively extracted with the flange on the sleeve pressed fast against the base plate, causing the base plate to be tightened.

The metallic blind rivet is complicated to fabricate and, after fabrication, entails the extra work of assembling its male and female members. Each rivet thus assembled must be fastened to the chuck for the purpose of insertion and subsequent fastening. When the pin is drawn out to provide required tightening, the excess portion of the drawn pin must be cut off. With a view facilitating the severance of such excess portion of the drawn pin after the step of riveting, there has been suggested a rivet which is provided on the pin with a groove such that the pin is cut off along the groove automatically when the tensile force exerted on the pin reaches a definite magnitude (U.S. Pat. No. 3,230,818). With this rivet, however, there is a possibility that the pin will break before the rivet has provided perfect tightening of the base plate. No continuous riveting work can be attained, therefore.

To preclude possible release of the pin from the sleeve in the blind rivet of the foregoing description, there has been proposed a blind rivet of a plastic material wherein the pin has its leading end shaped in a bulbous form and the sleeve has its leading end shaped so as to accommodate said bulbous end of the pin so that, when the rivet is passed through the base plate and the pin is drawn out, the leading end of the pin is lodged fast within the sleeve to expand the wall of the sleeve outwardly, with said expansion providing required tightening of the base plate and preventing otherwise possible release of the pin from the sleeve.

The blind rivet of plastic material, however, has found virtually no acceptance because it fails to deform as designed, sustains breakage and, owing to elasticity, entails a possibility of the pin being pulled out of the sleeve after the step of tightening.

An object of the present invention is to provide a blind rivet of plastic material which provides infallible tightening and permits absolutely no possibility of the male member being released from the female member after the step of tightening.

Another object of this invention is to provide a blind rivet of plastic material which is easy to manufacture and is constituted by a complete assembly of a female member and a male member.

Still another object of the invention is to provide a blind rivet of plastic material which is easily mounted on the riveting tool and permits continued riveting operation.

It is also an object of this invention to provide a blind rivet of plastic material which allows for a wide variation in the thickness of base plates to be riveted and in the diameter of holes to be bored in said base plates for insertion of the rivet.

It is a further object of the present invention to provide an improved manufacturing method for making blind rivets of plastic material.

SUMMARY OF THE INVENTION

The above and other objects are accomplished in accordance with this invention with a blind rivet of plastic material, which comprises a female member and a male member. The female member is comprised of a flexible tubular wall defining an axial bore and having an open upper end and a lower end, and a flange extending radially outwardly from the upper end of the tubular wall. The tubular wall defines a stepped portion in the bore at the open upper end and a plurality of elongate perforations extending longitudinally about the wall, the stepped portion forming a shoulder in the bore whence the stepped portion extends to the open upper end. The male member is comprised of a shank disposed in the axial bore of the female member and axially movable in relation to the tubular wall, an enlarged head at one end in intimate contact and engagement with the lower end of the female member, and a head portion at the other end and protruding from the open upper end of the female member. The head portion is shaped to be gripped by a tool for pulling the shank of the male member axially through the bore in relation to the female member. The shank has a series of peripheral check claws each forming a shoulder facing the lower end. Pulling of the shank causes the perforated flexible tubular wall of the female member to collapse and expand radially while the enlarged head of the male member remains in engagement with the lower end of the female member and causes successive check claws to snap their respective shoulders into engagement with the shoulder of the stepped portion. The engagement of the shoulders maintains the tubular wall of the female member radially expanded and locks the male member against axial movement towards the lower end of the female member. The flange and radially expanded tubular wall of the female member cooperate to permit an article to be held therebetween.

The manufacturing method of the invention comprises injection molding a molten plastic material under pressure into a cavity of a die shaped to form the above-described male member, placing the molded male member into a cavity of another die shaped to form the above-described female member, and injection molding a molten plastic material under pressure into the cavity of the other die around the shank of the male member.

In this double molding method, the male member of the blind plastic rivet is incorporated in the female member in an operation which may easily be performed on a mass-production scale.

Since the head portion of the shank can easily be molded to a shape capable of easy engagement with a tool used for pulling the male member, a multiplicity of blind rivets of this invention can easily be mounted on the tool and, therefore, can easily be subjected to a continuous riveting operation as compared to the conventional blind rivets which inevitably have had to be securely gripped one by one in the chuck of the tool. Moreover, the rivet of the present invention provides the required fastening of base plates by causing the tubular wall of the female member containing the elongate perforations to be expanded radially in the shape of petals. Accordingly, considerable tolerance is permissible in the thickness of base plates subjected to riveting and the diameter of holes bored in the base plates. This means that blind rivets of the present invention having one same size provide safe fastening on base plates having any thickness falling within a certain range and containing holes of any diameter falling within a certain range.

The objects and characteristic features of the present invention will become apparent from the following detailed description of certain now preferred embodiments, taken in conjunction with the accompanying drawing.

DETAILED DESCRIPTION OF THE INVENTION

Figure 1:
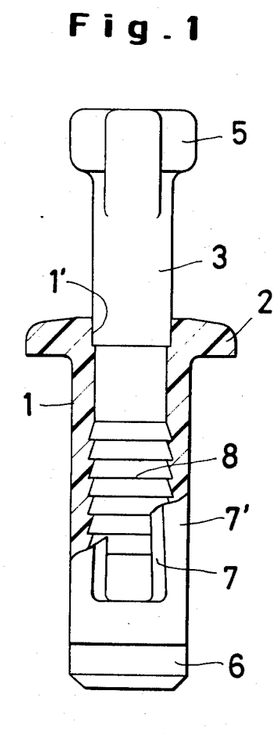
FIG. 1 is a partially sectioned frontal view illustrating a first embodiment of the blind rivet of plastic material according to the present invention.
Figure 2A:
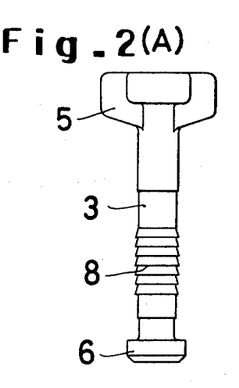
FIG. 2(A) is a frontal view of the male member of the rivet shown in FIG. 1.
Figure 2B:
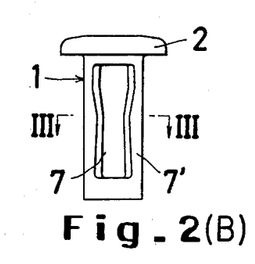
FIG. 2(B) is a frontal view of the female member of the rivet shown in FIG. 1.
Figure 3:
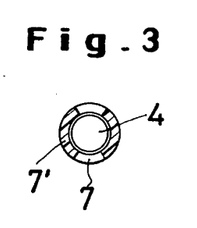
FIG. 3 is a cross section taken along the line III—III of FIG. 2(B).

FIGS. 1 through 3 illustrate female member 1 having a flexible tubular wall and flange 2 radially outwardly extending from the outer periphery of the upper open end 1' of the tubular wall. A male member 3 has a bar-like shank disposed on axial bore 4 of female member 1 and is provided at the upper end protruding from upper open end 1' of the female member with a head portion 5 and at the lower end protruding from the lower open end of the female member with enlarged head 6. Female member 1 has a small wall thickness in its principal tubular section to enjoy flexibility and is provided in the tubular wall thereof with two elongate perforations 7 in the longitudinal direction. Elongate perforations 7 are disposed diametrically opposite each other. They run substantially the whole length of the tubular wall of the female member with the exception of the upper and lower extremities of the wall. In the preferred embodiment, the perforations have a greater width at the upper end than at the lower end so that the tubular wall portion 7' between perforations 7 have a smaller width toward the upper end than toward the lower end.

The shank of the male member has a diameter such that the outer surface of the shank comes into tight engagement with the inner surface of the female member defining the axial bore. The length of the shank is substantially greater than that of the female member. Enlarged head 6 at the lower end thereof is in intimate contact with, and engages, the lower end of the female member and the upper end of the shank protrudes from the upper open end 1' of the female member to form head portion 5. This head portion is shaped to be gripped securely by a tool to be used for pulling the shank of the male member axially through bore 4. It, may be given any shape that suits the particular tool used for the purpose of pulling.

In the portion of the shank which is inserted in the axial bore 4 of the female member 1, the male member is provided with a series of peripheral check claws 8 disposed circumferentially with their shoulders facing the lower end, i.e. each check claw is of frusto-conical shape and has a base facing the lower end. The tubular wall of female member 1 which receives the shank of the male member defines stepped portion 9 (see FIG. 4A) on the bore at the upper open end thereof, which permits any check claw 8 to be brought into right engagement with the stepped portion.

As clearly shown in FIGS. 1–5, male member 3 has a multi-diameter configuration, peripheral check claws 8 providing a larger diameter portion of the shank and a leading portion of diminishing diameter facing head portion 5 of the male member. The larger diameter portion causes the male member to force outwardly material of the internal wall of tubular female member 1 to assure intimate and tight engagement of the rivet in the aperture of complementary work piece 10, 11 as the rivet is ultimately seated in the work piece (see FIG. 5).

Figure 4A:
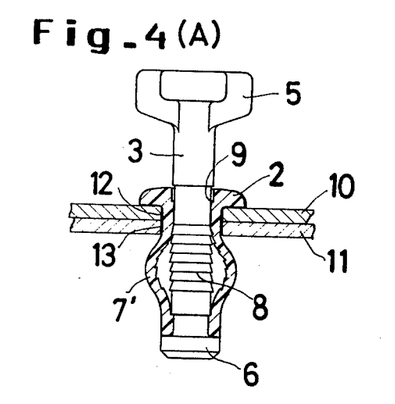
FIG. 4(A) is a partially sectioned frontal view illustrating the rivet of FIG. 1 at the time that fastening of two superposed plates is started.
Figure 4B:
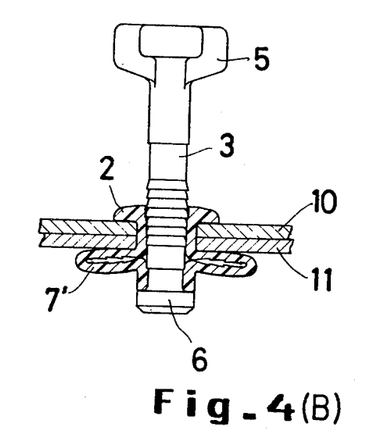
FIG. 4(B) is a partially sectioned frontal view illustrating the rivet of FIG. 1 at the time that fastening of two superposed plates has been completed.

The manner in which the blind rivet of the configuration described above is used in joining two superposed plates will be described with reference to FIG. 4. The two plates 10 and 11 are superposed, with their respective apertures 12 and 13 correctly registered. The rivet is inserted downwardly through the apertures until flange 2 formed at the upper end of the female member comes into contact with the upper surface of the upper plate 10. Then, with the flange pressed against the upper plate, the male member 3 which is inserted in the female member is pulled upwardly with the aid of a tool (not illustrated) so that the enlarged head 6 thereof at the lower end forcibly draws the lower end of the female member upwardly. Consequently, the female member 1 is compressed. As the magnitude of the pressure increases to surpass the limit of plasticity of the tubular portion, wall portions 7' between elongate perforations 7 expand radially, as shown in FIG. 4(A). As the male member is further pulled out, the radially expanded wall portions 7' of the female member are flattened out beneath the lower plate 11 in the shape of petals. The flattened wall portions and the flange 2 disposed opposite therefrom at the upper end of the female member will come to hold the plates 10 and 11 in a joined state therebetween (FIG. 4(B)). As a result, the shank of the male member protrudes upwardly from the female member and part of the check claws 8 formed circumferentially on the surface of the shank expose themselves above the upper open end of the female member and one of the check claws 8 comes into tight engagement with the stepped portion 9 formed in axial bore 4. Because of this tight engagement, the portion of the male member which has been drawn out of the female member remains stationary and serves to immobilize the female member in the state having its tubular wall radially expanded in the shape of petals.

Figure 5:
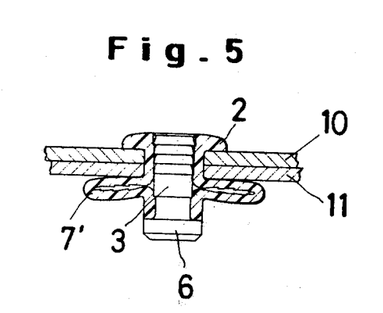
FIG. 5 is a partially sectioned frontal view illustrating the condition assumed when the portion of the male member upwardly protruding from the flange of the female member is cut off with a tool after the two plates have been fastened by use of the rivet of FIG. 1.

After the two plates have been united as described above, the portion of the shank of the male member protruding upwardly from the flange of the female member is cut off by a suitable method, as illustrated in FIG. 5, bringing the whole riveting operation to an end.

In this particular embodiment, the elongate perforations 7 formed in the tubular wall of the female member are given a greater width at the upper end than at the lower end and, consequently, the wall portions 7' therebetween have a smaller width toward the upper end than toward the lower end, so that the upper portion of the tubular wall has less rigidity than the lower portion thereof. When the male member is drawn out, therefore, the female member begins to bend first in the portion along the lower surface of the lower plate 11, so that the wall portions are allowed to expand readily and completely in the shape of petals until they are flattened against the upper surface of the plate 11 opposite flange 2. In the preferred embodiment, two elongate perforations 7 are formed in the tubular wall of the female member 1 so that the tubular wall will expand in two directions. Enitrely the same effect is obtained by incrasing the number of elongate perforations so that the tubular wall will expand in a greater number of directions and form as many flattened loops in the shape of petals. The number of the elongate perforations thus formed may be selected freely to suit the wall thickness, diameter and other simiilar factors of the female member in use.

Now the method for the manufacture of the blind rivet of this invention will be described. In metal dies shaped in advance to conform to the outer contour of the male member, a molten plastic material is injection molded to produce a male member. The molded male member is then placed in metal dies shaped in advance to conform to the overall contour of the rivet and molten plastic material is introduced to fill up the cavity of the metal dies. By this double molding method, a blind rivet having the male member and the female member assembled integrally is produced.

Figure 6:
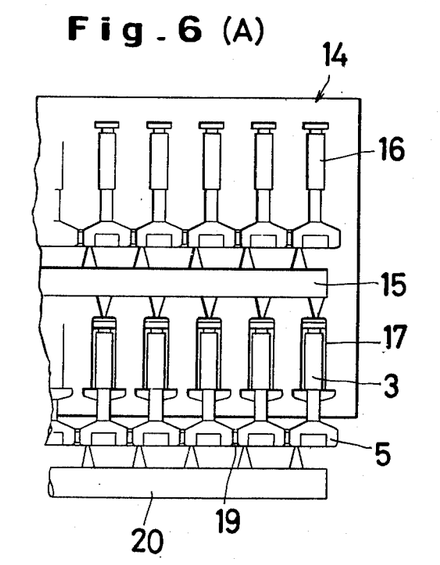
FIG. 6(A) is an explanatory diagram illustrating one working example of the method for manufacturing the blind rivet of plastic material according to the present invention.
FIG. 6(B) is an explanatory diagram illustrating the condition of the blind rivet of plastic material manufactured in accordance with the method of FIG. 9(A).

A typical method for the manufacture of the blind rivet of this invention will be described with reference to FIG. 6 (A). In a metal die 14, a path 15 for the molten plastic material is formed at the center. In the portion of the metal die upward from the path, cavities 16 for molding male members are arranged laterally in a row. In the portion of the metal die downward from the path, cavities 17 for molding rivets in their final form are similarly arranged laterally in a row. The cavities 16 for male members and the cavities 17 for finished rivets are equal in number and are arranged in the same direction and at the same intervals. In the metal die containing the cavities, the molten plastic material is introduced via the path 15 into the cavities 16 for male members and cavities 17 for finished rivets, respectively. The series of male members and the series of rivets (which are imperfect solid bodies in the first molding) thus molded are removed from the metal die. The imperfect rivet-shaped bodies are discarded and the male member alone are placed in the cavities 17 for furnished rivets and molten plastic material is injected into each of the cavities. In this way, a series of male members are molded in the cavities 16 and a series of rivets such having a male member incorporated into a female member are molded in the cavities 17. The blind rivets of the present invention, therefore, can be continuously manufactured by repeating the procedure which comprises removing the molded male members and finished rivets from the cavities, placing the removed male members into the cavities for finished rivets and injecting the molten plastic material into the metal die. If a readily severable connecting portion 19 is formed between heads 5 of the male members, as illustrated in FIG. 6(B), the molded rivets can be retained in their serially connected from even after they have been cut off the runner 20. The continuous riveting operation described hereinbelow is thus made possible.

Figure 13:
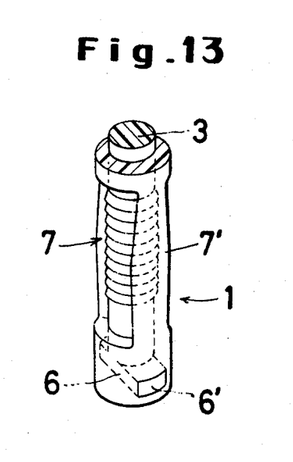
FIG. 13 is a perspective view illustrating the lower half part of an embodiment of the blind rivet of plastic material produced by the method illustrated in FIGS. 6(A) and 6(B).

As shown in FIG. 13, enlarged head 6 of the shank of male member 3 is formed in the shape of a bar, as also clearly appears from the shape of cavities 16 and 17 in FIG. 6(A), the male member being molded in cavities 16 and the bar extending perpendicularly relative to the axis of the rivet. As is also evident from cavities 17 in FIG. 6(A) and as shown in FIG. 13, the length of the bar is equal to the outside diameter of female member 1 which is molded in cavities 17. As shown in FIG. 6(A), when the molded male members are placed in cavities 17 for female members 1 to be molded thereabout by delivering molten plastic material into the die through path 15, the bars are positioned slightly spaced from the inlet to cavities 17 to permit the plastic to flow from path 15 into cavities 17. In this manner, enlarged bar-shaped head 6 is embedded in a complementary-shaped cavity provided in the wall of female tubular member 1 and intermediate the ends of the female member. Only end surfaces 6' of enlarged head 6 of the male member are exposed on the circumference of female member 1, with the remaining part of head 6 embedded therein. End surfaces 6' are positioned below wall portion 7' wherein elongate perforations 7 are formed to permit expansion and flattened in the shape of petals. In all other respects, the blind rivet of FIG. 13 operates in the same manner as the rivet described in connection with FIGS. 1 to 5.

The plastic material used as the starting material for the present invention may be freely selected from among known thermoplastic synthetic resins used for injection molding. Examples of synthetic resins which are usable include nylon, polycarbonate, polypropylene, polyacetal and polyethylene. The plastic material is suitably selected to meet best the particular purpose to which the produced rivets are put.

The male member and the female member in one rivet may be produced from the same kind of plastic material or they may be made from different kinds of plastic materials. When two different kinds of plastic materials are used, the melting point of the plastic material to be used in the former molding should be higher than that of the other plastic material to be used in the latter molding. Otherwise, the male member may possibly be fused onto the female member in the molden rivet. More specifically, when the molding of the female member follows that of the male member, the plastic material used in the male member is required to have a melting point higher than the plastic material used in the female member. Where one kind of plastic material is used or two different kinds of plastic materials having a common melting point are used, possible fusion of the male and female members may be prevented by first coating the molded male member with a known mold release agent, such as, for example, silicone, before it is placed in the mold for the female member and the molten plastic material is introduced. The molding process described above is carried out by following the known technique for the injection molding of plastic material. Since the rivet of the present invention is manufactured by the double molding method as described above, the two members of the rivet may be manufactured by using plastic materials different in color as well as in quality. Where the plastic materials are different in color, if the rivet is fastened on a base plate, the flange of the female member exposed above the base plate and the portion of the shank of the male member which protrudes from said flange have different colors. By appropriate shaping of the protruding portion of the shank, the rivet of the present invention may be used as a decorative article.

Figure 7:
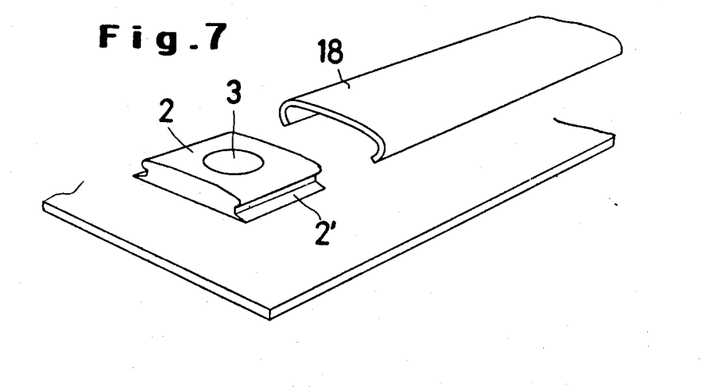
FIG. 7 is a perspective view illustrating a typical condition in which fastening of a molding is effected by use of the rivet of this invention.
Figure 8:
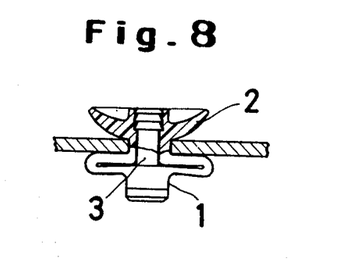
FIG. 8 through FIG. 10 are perspective views illustrating typical working examples involving applications of the rivet of the present invention.
Figure 9:
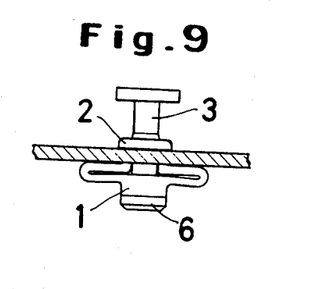
Figure 10:
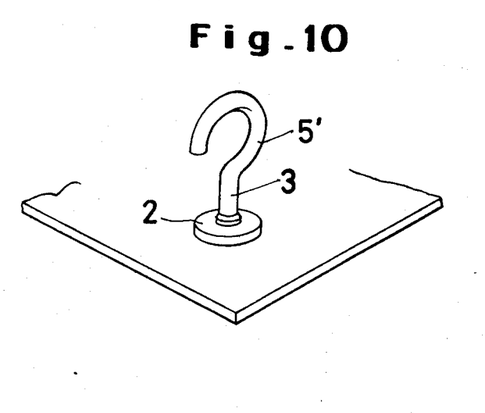

FIG. 7 depicts a preferred embodiment wherein the flange 2 of the female member is given a modified shape to permit attachment of some other articles. A molding 18 may readily be fastened to a lateral side of an automobile if the flange is given a square shape and a groove 2' is formed on each of an opposed pair of lateral sides of the square flange. The flange of the female member may be given a shape like a dish, as illustrated in FIG. 8, or the portion of the male member protruding above the flange may be given the shape of a stud, as shown in FIG. 9. If the rivet having such a flange or stud is fastened to a box of corrugated cardboard, the flange or stud may be used as a catch for the cord used to retain the lid of the box in its closed position. The head portion of the male member may be given a shape like a hook 5', as illustrated in FIG. 10. If the rivet containing such a male member is fastened onto a base plate and the protruding portion of the male member is left uncut, then the head portion of the male member may be used as a catch.

By giving the flange of the female member or the head portion of the male member which protrudes from the base plate various shapes to suit particular purposes, the rivet of the present invention can be used as a leg for fastening an article to the base plate or as a catch of a desired type.

Figure 11:
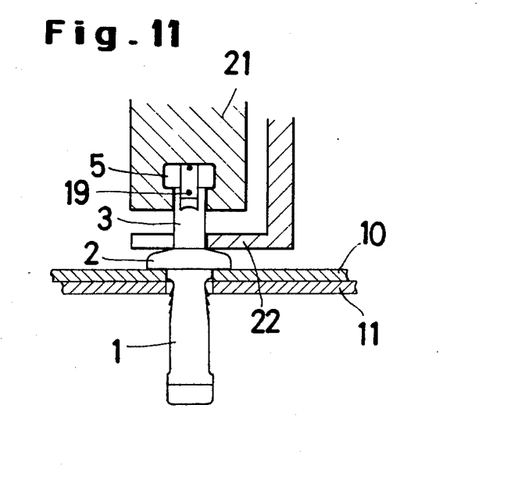
FIG. 11 is an explanatory diagram showing a rivet of plastic material according to this invention as it is held by a riveting tool.
Figure 12:
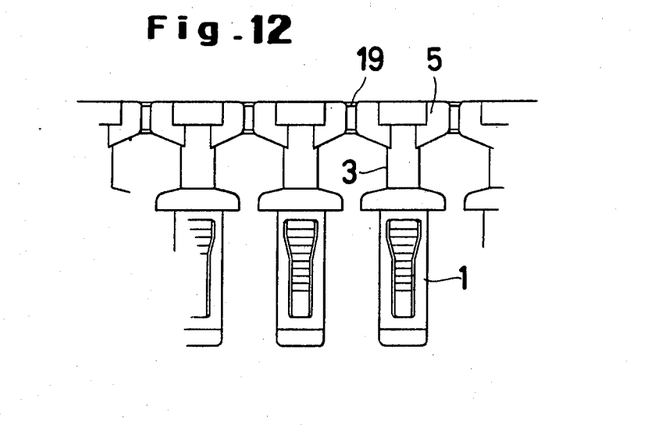
FIG. 12 is a frontal view illustrating a condition in which rivets of plastic material according to this invention ar joined.

As is evident from the foregoing description, the blind rivet of this invention can easily be fastened onto the base plate by drawing the male member from the female member incorporating said male member. Thus, the operation itself is easy and the required fastening can be accomplished from one side of the base plate. Thus, the rivet of this invention proves to be highly advantageous when it is used on a plate having a construction such that the opposite side thereof does not permit insertion of a tool or some other implement. Further, since the rivet of this invention has a configuration such that the extent to which the tubular wall of the female member is permitted to expand is variable with the length of the female member, the rivet is not affected by the wall thickness of the base plate or the diameter of holes bored therein. Thus, the rivet of this invention has an advantage that it suits any plate thickness or hole diameter insofar as a sufficient extent of expansion is obtainable. The head portion of the male member is given a shape freely selected to permit ready gripping by a tool being used for pulling the male member. Unlike the conventional rivets which have to be held securely in the chuck of a tool one by one, the rivets of this invention can easily be mounted on the tool. As shown in FIG. 11, riveting can be accomplished by gripping the rivet head portion 5 in a forked drawing tool 21 and then drawing out the male member 3 while at the same time retaining flange 2 of the female member 1 with a flange retaining plate 22. Therefore, rivets of the present invention manufactured by varying sizes can be fastened by use of one and the same tool as long as their head portions 5 which are to be gripped by the tool are given one fixed shape. Moreover, if a readily severable connecting portion 19 connects the head portions of the male members to connect the rivets in a series, as illustrated in FIG. 12, all the rivets in this series can be continuously subjected to the riveting operation by mounting the series of rivets all at once instead of causing the rivets to be mounted on the tool independently of one another. Incorporation of such a connecting portion 19 can readily be accomplished during the injection molding of plastic material. This constitutes a feature unattainable with metallic rivets.

As described above, the rivets of plastic material according to the present invention can easily be mass produced so as to dispense with the work of assembling the male members and female members. There is absolutely no possibility that the two members will come apart while the rivets are being transported or stored. Once the rivet is fastened to the base plate, the male member will never come out of the female member, so that the rivet provides safe fastening. Besides serving to unite a plurality of superposed plates the rivets of the present invention are usable as legs, hooks or decorative items on parts on which they are fastened when their portions protruding from the base plate are given varying shapes.

We claim:

1. A two-piece blind rivet of plastic material, which comprises a male member having a longitudinally elongated shank, an integrally molded enlarged head at its distal end and an integrally molded head portion at the other end of said shank adapted to be gripped by a pulling tool, the shank of said male member being provided with a series of check claws formed about the periphery of the shank in a series of longitudinally spaced frusto-conical configurations, the enlarged base of said frusto-conical configurations facing the enlarged head a female member mounted upon said male member and comprised of a flexible tubular wall shank portion defining an axial bore and having an open upper end and a lower end, means at the lower end of said wall portion to cooperate with said enlarged head of said male member and a flange extending radially outwardly from the opposite open upper end of said tubular wall, the internal wall of the tubular wall portion defining a series of stepped portions terminating in the vicinity of the open upper end of said female member, shoulder means complementary in diameter to the enlarged base of said check claws adjacent the open upper end of said female member and at least a pair of elongated perforations located on opposite portions of said tubular wall, the stepped portions provided in the internal wall of said female member being complementary in shape and dimension to the peripheral check claws and at least equal in number thereto whereby, upon mounting said blind rivet in an apertured workpiece, pulling of the shank in a longitudinaly direction relative to the associated mounted female member causes the perforated flexible tubular wall of the female member to collapse and expand radially outwardly, causes successive check claws to be snapped into intimate engagement with successive stepped portions in the bore to permit ultimate seating of one of said check claws in said complementary shoulder means to thereby retain said flange and radially expanded portion of the tubular wall in cooperative embracement with opposed work surfaces of the complementary apertured workpiece in which the rivet is adapted to be mounted.

2. The blind rivet of claim 1, further comprising connecting portions extending from the head portion of the male member, a row of like blind rivets being formed by connecting the connecting portions of the rivets to each other.

3. The blind rivet of claim 1, wherein the enlarged head of the male member is embedded in a complementary shaped cavity provided in the wall of the female tubular member and intermediate the ends of said female member.

4. The blind rivet of claim 1, wherein the male member has a multi-diameter configuration, the peripheral check claws providing a larger diameter portion of the shank and a leading portion of diminishing diameter facing the head portion of the male member, the larger diameter portion causing the male member to force outwardly material of the internal wall of the tubular female member to assure intimate and tight engagement of the rivet in the aperture of the complementary work piece as the rivet is ultimately seated in said work piece.

5. A two-piece blind rivet of plastic material which includes a male member having a longitudinally elongated shank, an integrally molded enlarged head at its distal end, and an integrally molded head portion at the other end of said shank adapted to be gripped by a pulling tool, the shank of said male member being provided with a series of check claws formed about the periphery of said shank in a series of longitudinally spaced frusto-conical configurations, the enlarged base of said frustums facing the enlarged head; a female member mounted upon said male member and including a tubular wall shank portion having an axial bore with complementary-shaped configurations at least equal in number to the check claws to embrace the check claws of said male member and a portion of the remainder of said longitudinally elongated shank portion, said tubular wall portion also including an upper end having a laterally extending flanged head portion in the vicinity of the head portion of said male shank member, shoulder means in said flanged head portion complementary in diameter to the enlarged base of said check claws, said tubular shank portion further having means adjacent the other end of said female member to cooperate with the enlarged head located at the distal end of said male member, apertures provided in the intermediate wall portion of the female member on opposed sides thereof to form distinct separated wall portions capable of being collapsed as the male member is pulled upwardly relative to the female member to form petals whereby said female member flanged head portion and said petals clampingly engage opposite surfaces of a complementary apertured workpiece, when mounted thereupon, as the male member is retracted relative to the female member and positively positioned in said retracted position by the engagement of the check claws with the complementary shoulder means in the internal wall of said bore passing through said female member flanged head portion.

* * * * *